(12) United States Patent
Arslan et al.

(10) Patent No.: US 12,526,171 B2
(45) Date of Patent: Jan. 13, 2026

(54) METHOD FOR PILOT-AIDED CHANNEL ESTIMATION IN OFDM SYSTEMS REGARDLESS OF THE FREQUENCY SELECTIVITY SEVERITY OF THE CHANNEL

(71) Applicant: ISTANBUL MEDIPOL UNIVERSITESI, Istanbul (TR)

(72) Inventors: Hüseyin Arslan, Istanbul (TR); Salah Eddine Zegrar, Istanbul (TR)

( * ) Notice: Subject to any disclaimer, the term of this patent is extended or adjusted under 35 U.S.C. 154(b) by 362 days.

(21) Appl. No.: 18/255,408

(22) PCT Filed: Dec. 16, 2021

(86) PCT No.: PCT/TR2021/051425
§ 371 (c)(1),
(2) Date: Jun. 1, 2023

(87) PCT Pub. No.: WO2022/132110
PCT Pub. Date: Jun. 23, 2022

(65) Prior Publication Data
US 2024/0022453 A1    Jan. 18, 2024

(30) Foreign Application Priority Data

Dec. 17, 2020   (TR) .................. 2020/20751

(51) Int. Cl.
*H04L 25/02*  (2006.01)
*H04L 27/26*  (2006.01)

(52) U.S. Cl.
CPC ........ *H04L 25/0224* (2013.01); *H04L 27/263* (2013.01); *H04L 27/2651* (2021.01)

(58) Field of Classification Search
CPC .................. H04L 25/0224; H04L 27/2651
See application file for complete search history.

(56) References Cited

U.S. PATENT DOCUMENTS

| | | | |
|---|---|---|---|
| 10,637,705 B1 * | 4/2020 | Shattil | ................. H04L 27/2614 |
| 10,848,360 B1 | 11/2020 | Kuchi | |
| 2005/0068886 A1 | 3/2005 | Wang | |
| 2022/0278721 A1 * | 9/2022 | Fukuzono | ............ H04B 7/0413 |

FOREIGN PATENT DOCUMENTS

EP          3491795 B1     7/2020

OTHER PUBLICATIONS

International Search Report for corresponding PCT/TR2021/051425 dated Apr. 8, 2022.
Written Opinion of the International Searching Authority for corresponding PCT/TR2021/051425 dated Apr. 8, 2022.
(Continued)

*Primary Examiner* — Zhiren Qin
(74) *Attorney, Agent, or Firm* — Egbert, McDaniel & Swartz, PLLC

(57) ABSTRACT

Disclosed is a method pilot-aided channel estimation in Orthogonal Frequency Division Multiplexing (OFDM) systems regardless of the frequency selectivity severity of the channel is proposed.

1 Claim, 1 Drawing Sheet

(56) References Cited

OTHER PUBLICATIONS

Chouinard, Jean-Yves & Wang, Xianbin & Wu, Yiyan. (2005). MSE-OFDM: a new OFDM transmission technique with improved system performance. Acoustics, Speech, and Signal Processing, 1988. ICASSP-88., 1988 International Conference on. 3. iii/865-iii/868 vol. 3. 10.1109/ICASSP.2005.1415847.

K. Kwak, S. Lee, J. Kim and D. Hong, "A New DFT-Based Channel Estimation Approach for OFDM with Virtual Subcarriers by Leakage Estimation," in IEEE Transactions on Wireless Communications, vol. 7, No. 6, pp. 2004-2008, Jun. 2008, doi: 10.1109/TWC.2008.061093.

K. Zheng, J. Su and W. Wang, "DFT-Based Channel Estimation in Comb-Type Pilot-Aided OFDM Systems with Virtual Carriers," 2007 IEEE 18th International Symposium on Personal, Indoor and Mobile Radio Communications, 2007, pp. 1-5, doi: 10.1109/PIMRC.2007.4394389.

\* cited by examiner

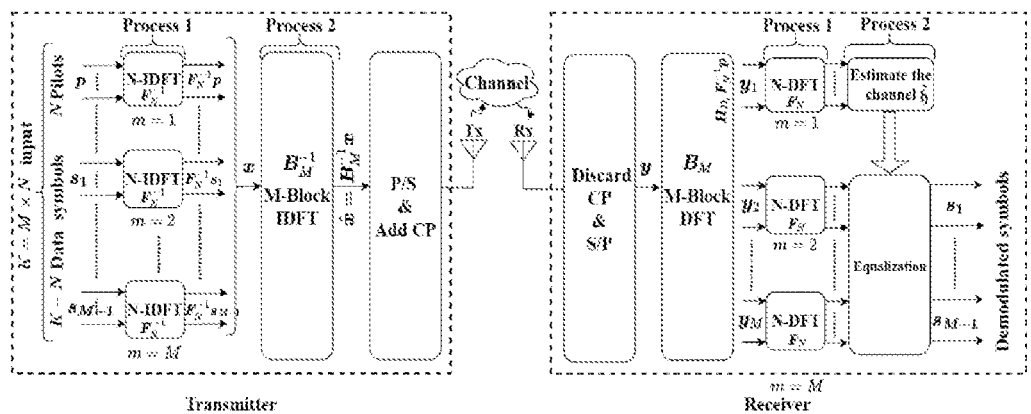

METHOD FOR PILOT-AIDED CHANNEL ESTIMATION IN OFDM SYSTEMS REGARDLESS OF THE FREQUENCY SELECTIVITY SEVERITY OF THE CHANNEL

TECHNICAL FIELD

In this invention, A method for pilot-aided channel estimation in Orthogonal Frequency Division Multiplexing (OFDM) systems regardless of the frequency selectivity severity of the channel is proposed.

PRIOR ART

Flexibility is one the main features of next generation communication systems, where the parameters of the network are no longer fixed. For instance, 5-th generation (5G) has introduced the numerology concept where the orthogonal frequency division multiplexing (OFDM) waveform is differently configured in time-frequency lattice used to satisfy the varying requirements of the users. To further enhance the multi-numerology systems for 6-th generation (6G), flexible and adaptive cyclic prefix (CP) was proposed. One configuration of the flexible CP waveforms is called multi-symbol encapsulated orthogonal frequency division multiplexing (MSE-OFDM), that is also known by Common CP-OFDM. MSE-OFDM groups a number of OFDM symbols and uses one CP to protect them when the channel is slow time-variant, thus reducing the redundancy caused by the CP. MSE-OFDM waveform has been widely used as a solution to mitigate the inter-numerology interference (INI) in multi-numerology OFDM systems, where it provides perfect alignment of the symbols with different numerologies since they are encapsulated with one CP}.

Due to this unique frame structure, channel estimation for MSE-OFDM is unlike the conventional OFDM systems where the channel impulse response (CIR) is estimated and tracked in real-time thanks to fixed known symbols (pilots) multiplexed with the data. In MSE-OFDM systems, pilots and their position cannot be easily detected. This is due to the inter-symbol interference (ISI) between the OFDM symbols in MSE-OFDM and the fact that one CP is added for the whole frame. Therefore, the estimation of the pilots and the interpolation of channel frequency response (CFR) as in conventional OFDM is not possible. As a result, only complex time-domain equalizers are used for MSE-OFDM. For instance, proposed iterative ISI estimation and cancellation techniques for the MSE-OFDM system; however, this algorithm is computationally complex and achieves low performance compared to CP-OFDM. While some other studies consider the maximum likelihood (ML) estimator, which is extremely computationally expensive compared to other estimators such as least-square (LS) that is used in conventional CP-OFDM.

Aims of the Invention and Brief Description

The present invention is related to a method for pilot-aided channel estimation in orthogonal frequency division multiplexing (OFDM) systems regardless of the frequency selectivity severity of the channel in order to eliminate the disadvantages mentioned above and to bring new advantages to the related technical field.

This invention provides a novel multi-symbol encapsulated orthogonal frequency division multiplexing (MSE-OFDM) transceiver design, which is a novel way of implementing OFDM differently, where two DFT processes are added to the conventional scheme at the transmitter and receiver. The developed system makes the channel estimation and equalization very similar to conventional OFDM systems. Hence, optimal pilot-based channel estimation technique is proposed with low computational complexity where the channel is estimated at the pilots and interpolated for the total subcarriers.

The proposed algorithms can encapsulate multiple OFDM symbol in one frame while maintaining the ability of simple equalization at the receiver side. Furthermore, it proposes a new design of generating OFDM-like waveforms using cascaded discrete Fourier transform (DFT) operations.

1. CP overhead and redundant communication.
2. Complex time equalization for MSE-OFDM with the loss of performance.
3. Robustness against delay spread.

The disclosed invention is a superior design, few of its advantages are mentioned below:

1—The enclosed transceiver design introduces a new concept of utilizing cascaded DFTs to perform OFDM-like modulation.

2—The enclosed design is computationally less complex compared to OFDM, thus suitable for low latency application.

3—The enclosed invention makes the channel estimation and equalization very similar to conventional OFDM systems.

4—The enclosed invention proposes an optimal pilot-based channel estimation technique is proposed with low computational complexity where the channel is estimated at the pilots and interpolated for the total subcarriers.

5—The proposed algorithm can encapsulate multiple OFDM symbol in one frame while maintaining the ability of simple equalization at the receiver side.

6—The proposed algorithm reduces the CP overhead for faster and less redundant communication.

7—The proposed algorithm enables simple frequency equalization for MSE-OFDM without losing the performance.

8—The enclosed invention shows robustness against delay spread.

9—The disclosed invention gives perfect channel estimation, instead of the interpolated channel.

10—The disclosed invention uses the minimum possible pilot-overhead.

11—The disclosed invention has no degradation in performance as the channel multipath increases (highly selective channels).

Any wireless communication technology can utilize this invention to provide protection to data, pilots or jointly data and pilots against eavesdroppers. However, standards like 3GPP-based cellular and IEEE 802.11 based Wi-Fi networks, or any wireless network are particularly relevant to the invention due to the support of multipoint coordination provided in both standards. Furthermore, the described method in this invention can be implemented on any device, system or network capable of supporting any of the aforementioned standards, for instance: code division multiple access (CMDA), frequency division multiple access (FDMA), Global System for Mobile communications (GSM), GSM/General Packet Radio Service (GPRS), Enhanced Data GSM Environment (EDGE), Wideband-CDMA (W-CDMA), Evolution Data Optimized (EV-DO), High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, 5G New Radio (NR), or other known signals that are used to communicate within a wireless, cellular or internet of things (IoT) network.

The invention is a method to modulate, transmit, receive, and decode the communication signal. As such, it is applicable to industry which is interested in transceiver and waveform design.

DEFINITION OF THE FIGURES

The FIGURES have been used in order to further disclose a method for pilot-aided channel estimation in orthogonal frequency division multiplexing (OFDM) systems regardless of the frequency selectivity severity of the channel developed by the present invention which the FIGURES have been described below:

FIG. 1: Proposed transceiver design
Some definitions in FIGURE:
Cyclic prefix (CP),
Channel impulse response (CIR),
Inverse discrete Fourier transform (IDFT),
Transmitter (Tx),
Receiver (Rx),
Serial (S),
Parallel (P),
Serial to parallel S/P,
Data symbols,
Demodulated symbols.

DETAILED DESCRIPTION OF THE INVENTION

The novelty of the invention has been described with examples that shall not limit the scope of the invention and which have been intended to only clarify the subject matter of the invention. The present invention has been described in detail below.

Transmitter Design:

At the t-th symbol time, the MSE-OFDM transmitter converts M OFDM symbols $S_m(k)$, k=1, ..., N, m=1, ..., M comprising N orthogonal subcarriers from frequency-domain to $x_m(n)$, n=1, ..., N in time-domain using the IDFT. The first symbol out of the M symbols contains N known pilots used for channel estimation, where the rest (M−1)×N subcarriers are used for data transmission. To combat ISI, CP is appended to the signal and then it is transmitted as depicted in FIG. 1.

The wireless channel is assumed to be slow time-varying, i.e., CIR is invariant for each MSE-OFD symbol with $N_{tap}$ path components. Also, $$y[n]=h[n] \otimes x[n]+z[n], \quad (1)$$

where x[n] is the OFDM modulated signal and z[n] denotes the zero-mean AWGN with variance $\sigma_2$. To cast (1) from serial to matrix-vector form, we define $y=[y(1), \ldots, y(K)]^T$, $x=[x(1), \ldots, x(K)]^T$ and $z=[z(1), \ldots, z(K)]^T$ to be the $\mathbb{C}^{K \times 1}$ vectors, and $h=[h_1, \ldots, h_{\{N_{tap}\}}]^T$ to be the $\mathbb{C}^{N_{tap} \times 1}$ channel vector. Therefore, (1) is rewritten as:

$$y=h \otimes x+z=H_c x+z, \quad (2)$$

where $H_c$ denotes the circulant channel matrix which is given as:

$$H_c = \begin{bmatrix} h_1 & 0 & 0 & \ldots & h_{N_{tap}} & h_{N_{tap}-1} & \ldots & h_2 \\ \vdots & & \ddots & & & \vdots & & \\ 0 & \ldots & 0 & h_{N_{tap}} & \ldots & & & h_1 \end{bmatrix} \quad (3)$$

Z denotes the noise vector. The channel matrix $H_c$ can be expressed a circulant matrix of $$\frac{K}{K_p} \times \frac{K}{K_p}$$

sub-matrices; then, $H_c$ can be rewritten as:

$$H_c = \begin{bmatrix} H_1 & O & O & \ldots & H_2 \\ \vdots & & \ddots & & \vdots \\ O & & \ldots & O & H_2 & H_1 \end{bmatrix} \quad (4)$$

where $O \in \mathbb{C}^{\{K_p \times K_p\}}$ denotes the zeros matrix, and $H_1 \in \mathbb{C}^{\{K_p \times K_p\}}$ and $H_2 \in \mathbb{C}^{\{K_p \times K_p\}}$ are given by:

$$H_1 = \begin{bmatrix} h_1 & 0 & 0 & \ldots & 0 \\ \vdots & & \ddots & & \vdots \\ h_{N_{tap}} & \ldots & h_1 & \ldots & 0 \end{bmatrix}, H_2 = \begin{bmatrix} 0 & 0 & h_{N_{tap}} & \ldots & h_2 \\ \vdots & & \ddots & & \vdots \\ 0 & \ldots & 0 & \ldots & 0 \end{bmatrix} \quad (5)$$

It should be noticed that $\mathfrak{H}=H_1+H_2$ is also a circulant matrix and it contains all non-zero values of the matrix $H_c$, thus, it is a smaller representation of the channel matrix $H_c$. Therefore, fully estimating $H_c$ is equivalent to only estimating $\mathfrak{H}$.

Differently from the conventional MSE-OFDM transceiver, in the proposed design, M×M block-DFT and its inverse process are introduced at the receiver and the transmitter sides, respectively, as depicted in FIG. 1. The added DFTs are block-based DFTs i.e., each submatrix in $H_c$ is treated as one single element and the DFT matrix $F_M$ serves to block-diagonalize $H_c$.

Let $B_M$ denote the block-DFT process which is a DFT process that takes complex vectors as an input instead of complex values. It can be explicitly represented in terms of DFT process as $B_M = F_M \otimes I_N$, where $I_N$ represents the N\times N identity matrix, $F_M \in \mathbb{C}^{\{K_p \times K_p\}}$ and $B_M \in \mathbb{C}^{\{K_p \times K_p\}}$.

Let the unmodulated transmitted signal be $s=[P_1, \ldots, P_N, S_1, \ldots, S_{K-N}]^T = [p^T, s_1^T, \ldots, s_{M-1}^T]^T$, where $p \in \mathbb{C}^{N \times 1}$ is the first sub-symbol containing the pilots, and $s_i \in \mathbb{C}^{N \times 1}$ denotes the i-th data sub-symbol. Then, transmitted signal is found as:

$$\hat{x}=B_M^{-1}x, \quad (6)$$

where $x=[F_N^{-1}p^T, F_N^{-1}s_1^T, \ldots, F_N^{-1}s_{M-1}^T]^T$ and $F_N^{-1}$ is the N×N inverse DFT matrix.

Receiver Design:

At the receiver side, after discarding the CP, the received signal is written as:

$$y=H_c \hat{x}+z=H_c B_M^{-1}x+z, \quad (7)$$

As shown in FIG. 1 (b), there are two DFT processes at the receiver side after discarding the CP. Let $y^1$ and $y^2$ be the output of the first and second process, respectively. $y_1$ is the output of the block DFT, then:

$$y^1=B_M H_c B_M^{-1}x+B_M z=H_D x+B_M z, \quad (8)$$

Note that since $H_c$ is circulant, then $H_D$ is diagonal matrix given by:

$$H_D = \begin{bmatrix} H_{D_1} & \ldots & O \\ \vdots & \ddots & \vdots \\ O & \ldots & H_{D_N} \end{bmatrix}, \quad (9)$$

where $H_{D_1} = \mathfrak{H} = H_1+H_2$.

In order to estimate the channel, only the first N samples of $y_1$ (i.e., the first sub-symbol $H_{D_1}F_N^{-1}p$) are considered for the second process. Then, the output of the second process is given by:

$$y^2 = F_N \mathfrak{H} F_N^{-1}p + F_N z_1 = \mathfrak{H}_D p + F_N z_1 = \mathfrak{h}_N \odot p + F_N z_1 p$$
$$\mathfrak{h}_N + F_N z_1, \quad (10)$$

where $z_1$ contains the first N samples of $B_M$ z. P is the diagonal matrix having p as a diagonal and $\mathfrak{H}_D$ is the diagonal matrix containing the N point CFR $\mathfrak{h}_N$ of the wireless channel given by $$\mathfrak{h}_N = \text{diag}(\mathfrak{H}_D) = \text{DFT}(h,N) = F_N h, \quad (11)$$

Channel Estimation Scheme:

At the receiver side the pilots are recovered without any interference from the data. Therefore, conventional OFDM channel estimation algorithms can be applied, such MMSE and LS estimators. the LS estimation is used for the estimation. Least-square (LS), Minimum mean squared error (MMSE)

Let $\mathfrak{h}_N = [H(1), \ldots, H(K)]^T$ be the CFR vector, then the estimated channel $\hat{\mathfrak{h}}$ is readily found as:

$$\hat{\mathfrak{h}} = \text{DFT}(F_N^{-1}P^{-1}y_2, K) = \text{DFT}(F_N^{-1}P^{-1}(P\mathfrak{h}_N + F_N z_1),$$
$$K) = \text{DFT}(F_N^{-1}\mathfrak{h}_N + F_N^{-1}P^{-1}F_N z_1, K) = \mathfrak{h}_N + \tilde{z}_1$$

where $\tilde{z}_1 = \text{DFT}(F_N^{-1}p^{-1}F_N z_1, K)$.

A method for pilot-aided channel estimation in orthogonal frequency division multiplexing (OFDM) systems regardless of the frequency selectivity severity of the channel comprising the steps of;

For channel estimation;

In the transmitter;

Converting M OFDM symbols as $S_m(k)$, k=1, ..., N, m=1, ..., M

Comprising of each comprising N orthogonal subcarriers from frequency-domain to $x_m(n)$, n=1, ..., N in time-domain using the IDFT, Out of the first symbol of M symbols contains N known pilots used for channel estimation, where the rest (M−1)×N subcarriers are used for data transmission, Applying block IDFT to the M subsymbols as given in equation (6) $\ddot{x} = B_M^{-1}x$, Aligning the data from parallel to serial, Adding of cyclic prefix, Passing to transmitter through channel, For enhanced channel estimation;

In the receiver,

Discarding of the CP,

After discarding the CP, the received signal is written as:

$$y = H_c \hat{x} + z = H_c B_M^{-1} x + z,$$

Applying the M-block DFT to the received signal $y^1$, $$y^1 = B_M H_c B_M^{-1} x + B_M z = H_D x + B_M z,$$

Applying N-DFT (N is the DFT(FFT) size that is given as 2^B, where b is a positive integer.) process to the first subsymbol $y_1$.

$$y^2 = F_N \mathfrak{H} F_N^{-1}p + F_N z_1$$

Estimating the channel by using $$\hat{\mathfrak{h}} = \text{DFT}(F_N^{-1}P^{-1}y_2, K) = \text{DFT}(F_N^{-1}P^{-1}(P\mathfrak{h}_N + F_N z_1),$$
$$K) = \text{DFT}(F_N^{-1}\mathfrak{h}_N + F_N^{-1}P^{-1}F_N z_1, K) = \mathfrak{h}_N + \tilde{z}_1$$
$$\text{where } \tilde{z}_1 = DFT(F_N^{-1}p^{-1}F_N z_1, K).$$

where $\tilde{z}_1 = \text{DFT}(F_N^{-1}p^{-1}F_N z_1, K)$.

Applying of equalization process (equalization is well known in the literature and it is done via many algorithms), Demodulated symbols.

The invention claimed is:

1. A method for pilot-aided channel estimation in orthogonal frequency division multiplexing (OFDM) system regardless of frequency selectively severity of a channel, the method comprising:

estimating the channel in a transceiver by the step of:
converting M OFDM symbols as $S_m(k)$, k=1, ..., N, m=1, ..., M;
inverse discrete Fourier transforming N orthogonal subcarriers from a frequency-domain to $x_m(n)$, n=1, ..., N in time-domain;
using a first symbol of the M OFDM symbols containing N known pilots for channel estimation;
using a remainder of the N orthogonal subcarriers for data transmission;
applying M-block inverse discrete Fourier transforms (DFT) to M subsymbols;
applying parallel to serial;
adding a cyclic prefix (CP); and
passing to a transmitter through the channel;

enhancing channel estimation in the transceiver by the steps of;
discarding the CP;
writing the received signal as:
$y = H_c \hat{x} + z = H_c B_M^{-1} x + z$, wherein y is the received signal after discarding the cyclic prefix, $H_c$ is a circulant channel matrix of MN×MN size representing the channel, $\hat{x}$ is a transmitted data vector stacked from all OFDM symbols after an M-point block-IDFT operator, z=an additive white Gaussian noice vector, $B_m^{-1}$ is an inverse block-discrete Fourier transform;
applying the M-block discrete Fourier transform (DFT) to a received signal ($y^1$ wherein $$y^1 = B_M H_c B_M^{-1} x + B_M z$$

$$= H_D x + B_M z,$$

where $B_M$ is an M-point block DFT operator, $H_D$ is a block-diagonalized channel matrix after applying the block-DFT transform;

applying an N-DFT process to a first subsymbol ($y_1$) in accordance with, $y^2 = F_N \mathfrak{H} F_N^{-1}p + F_N z_1$, where $y^2$ is an output after applying the N-point DFT on the first subsymbol, $F_N$ is an N-point DFT matrix, $\mathfrak{H}$ is a time domain circulant channel matrix of size N×N, $F_N^{-1}$ is an inverse N-point DFT matrix, p is a pilot vector of the first subsymbol, $z_1$ is a noise vector corresponding to the first subsymbol after block DFT;

estimating the channel using:

$$\mathfrak{h} = \text{DFT}(F_N^{-1}P^{-1}y_2, K) = \text{DFT}(F_N^{-1}P^{-1}(P\mathfrak{h}_N + F_N z_1),$$
$$K) = \text{DFT}(F_N^{-1}\mathfrak{h}_N + F_N^{-1}P^{-1}F_N z_1, K) = \mathfrak{h}_N + \tilde{z}_1$$
$$\text{where } \tilde{z}_1 = \text{DFT}(F_N^{-1}p^{-1}F_N z_1, K).$$

where $\tilde{z}_1 = \text{DFT}(F_N^{-1}p^{-1}F_N z_1, K)$, where $\mathfrak{h}$ is a channel frequency response of MN×1 length, K is N×M, P is a pilot-symbol diagonal matrix where known pilot symbols are inserted, $h_N$ is a channel impulse response of N×1 length; $\tilde{z}_1$ is an equivalent noise after pilot-based channel estimation;

applying an equalization process; and demodulating the symbols.

* * * * *